United States Patent
Onishi et al.

(10) Patent No.: US 7,524,258 B2
(45) Date of Patent: Apr. 28, 2009

(54) VEHICULAR AUTOMATIC TRANSMISSION

(75) Inventors: Hirofumi Onishi, Aichi-gun (JP); Yuji Yasuda, Nishikamo-gun (JP); Terufumi Miyazaki, Toyota (JP); Makoto Murakami, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 289 days.

(21) Appl. No.: 11/556,831

(22) Filed: Nov. 6, 2006

(65) Prior Publication Data

US 2007/0149346 A1 Jun. 28, 2007

(30) Foreign Application Priority Data

Dec. 28, 2005 (JP) ............... 2005-379505

(51) Int. Cl.
*F16H 3/44* (2006.01)
(52) U.S. Cl. ...................... 475/286; 475/136
(58) Field of Classification Search ............... 475/116, 475/136, 137, 146, 159, 271, 286, 317, 331; 74/606 R
See application file for complete search history.

(56) References Cited

U.S. PATENT DOCUMENTS

| | | | | | |
|---|---|---|---|---|---|
| 2,576,336 | A | * | 11/1951 | Farkas | ............... 477/60 |
| 3,739,647 | A | * | 6/1973 | Crooks | ............... 74/15.63 |
| 3,747,730 | A | * | 7/1973 | Hause | ............... 192/87.11 |
| 6,344,010 | B1 | * | 2/2002 | Tajima et al. | ............... 475/331 |

FOREIGN PATENT DOCUMENTS

JP  8-170699  7/1996

* cited by examiner

*Primary Examiner*—Thu Nguyen
*Assistant Examiner*—Erin D Bishop
(74) *Attorney, Agent, or Firm*—Oblon, Spivak, McClelland, Maier & Neustadt, P.C.

(57) ABSTRACT

A vehicular automatic transmission including a first planetary gear device and a first set of frictional coupling elements, which can be supported by a pump housing via first and second retainer rings, at predetermined axial positions within the pump housing, during assembling of the automatic transmission. The first retainer ring is fixed to a radially inner spline-fitting part of a cylindrical extending portion of the pump housing, while the second retainer ring is fitted in a first circumferential groove formed in a ring gear of the first planetary gear device and a second circumferential groove formed in the inner circumferential surface of a splined cylindrical portion of a first hub splined to the outer circumferential surface of the ring gear and the radially inner portions of the first set of frictional coupling elements. The automatic transmission is manufactured by assembling a subassembly with respect to a stationary cylindrical housing to which the pump housing is fixed. The subassembly includes the pump housing provided with an oil pump, first planetary gear device and first set of frictional coupling elements.

8 Claims, 3 Drawing Sheets

|     | C1 | C2 | B1 | B2 | B3 |
|-----|----|----|----|----|----|
| 1st | ◯  |    |    | ◯  |    |
| 2nd | ◯  |    | ◯  |    |    |
| 3rd | ◯  |    |    |    | ◯  |
| 4th | ◯  | ◯  |    |    |    |
| 5th |    | ◯  |    |    | ◯  |
| 6th |    | ◯  | ◯  |    |    |
| Rev |    |    |    | ◯  | ◯  |

VEHICULAR AUTOMATIC TRANSMISSION

This application is based on Japanese Patent Application No. 2005-378505 filed Dec. 28, 2005, the contents of which are incorporated herein by reference.

BACKGROUND OF THE INVENTION

1. Field of the Invention

The present invention relates in general to a vehicular automatic transmission, and more particularly to a structural improvement of a vehicular automatic transmission, which permits an improvement in the efficiency of assembling of the vehicular automatic transmission.

2. Discussion of Related Art

There has been a growing need of improving the efficiency of assembling of a vehicular automatic transmission, to satisfy a recently increasing number of manufacture of motor vehicles. In a conventional method of assembling of the vehicular automatic transmission, all parts of the automatic transmission are assembled on a main assembling line, so that the required length of the main production line tends to increase with an increase of the required number of assembling steps, with a result of an increase of the required installation space for the main assembling line. A shut-down of the main assembling line due to shortage of any part or an assembling error at a local portion of the main assembling line results in interruption of all assembling steps and a consequent drop of productivity of the automatic transmission. JP-8-170699 A discloses an example of a technique to simplify the main assembling line and reduce a risk of the shutdown of the main assembling line for thereby improving the productivity of the automatic transmission. According to this technique, frictional coupling elements of a frictional coupling device in the form of a brake are mounted on a rear casing of the automatic transmission, so that the frictional coupling elements can be assembled on the automatic transmission on a sub-assembling line.

Some motor vehicles of different configurations use the same type of automatic transmission, which use casings of respective different configurations. Although the rear casing and the related parts can be assembled into a subassembly, this subassembly cannot be used for the motor vehicles of the different configurations using the same type of automatic transmission. In this respect, the conventional vehicular transmission has a room for further improvements. Usually, the accuracy of machining of the rear casing is not high except for its surfaces in contact with a main casing of the automatic transmission. However, the rear casing to be assembled together with its related parts according to the technique disclosed in the above-identified publication requires a higher degree of accuracy of machining to form an oil chamber for a piston of the brake, and a splined portion engaging the above-indicated frictional coupling elements in the form of friction plates, for example. Thus, the technique in question requires the rear casing which should be manufactured with the high degree of accuracy at a relatively large number of its structural portions, and accordingly requires a larger number of machining steps and additional jigs for the machining steps.

SUMMARY OF THE INVENTION

The present invention was made in view of the background art described above. It is an object of this invention to provide a vehicular automatic transmission which includes a subassembly usable for both front-engine front-drive vehicles and front-engine rear-drive vehicles, permitting the use of a short main assembling line for assembling the automatic transmission at a high degree of efficiency, with a reduced risk of shutdown of the main assembling line.

The object indicated above may be achieved according to the principle of the present invention, which provides a vehicular automatic transmission comprising: a stationary cylindrical housing; a first planetary gear device accommodated in the stationary cylindrical housing and including a ring gear: a first set of frictional coupling elements accommodated in the stationary cylindrical housing; a generally disc-shaped pump housing fixed to the cylindrical housing, so as to close an axial open end of the stationary cylindrical housing; a cylindrical extending portion which extends into the stationary cylindrical housing from a radially outer portion of the pump housing in an axial direction of the pump housing and which includes a radially inner spline-fitting part; the first planetary gear device being disposed radially inwardly of the radially inner spline-fitting part; the first set of frictional coupling elements being disposed between the ring gear of the first planetary gear device and the radially inner spline-fitting part of the cylindrical extending portion, to selectively fix ring gear to the cylindrical extending portion; a first retainer ring fixed to an axial end portion of the radially inner spline-fitting part, which axial end portion is remote from the pump housing, the first retainer ring abutting the first set of frictional coupling elements, to limit an axial movement of the first set of frictional coupling elements; a first hub including a splined cylindrical portion having splined outer and inner circumferential surfaces, and further including an annular flange portion which extends from an axial end of the splined cylindrical portion radially inwardly of the splined cylindrical portion, the splined cylindrical portion being splined at its splined inner circumferential surface to an outer circumferential surface of the ring gear, and at its splined outer circumferential surface to radially inner portions of the first set of frictional coupling elements, so as to permit an axial movement and prevent a rotary movement of the first hub relative to the ring gear and the first set of frictional coupling elements; the ring gear having a first circumferential groove formed in the outer circumferential surface, and the splined cylindrical portion of the first hub having a second circumferential groove formed in the splined inner circumferential surface; and a second retainer ring being fitted in the first and second circumferential grooves, whereby the first set of frictional coupling elements and the first planetary gear device can be supported by the pump housing via the first and second retainer rings, at predetermined axial positions within the cylindrical extending portion of the pump housing, during assembling of the vehicular automatic transmission.

The vehicular automatic transmission of the present invention constructed as described above is arranged to install the first set of frictional coupling elements and the first planetary gear device in the pump housing such that an axial movement of the first set of frictional coupling elements is limited by the first retainer ring fixed to the radially inner spline-fitting part of the radially outer cylindrical portion of the pump housing, while an axial movement of the first planetary gear device is limited by the annular flange portion of the first hub the axial movement of which is limited by the second retainer ring and the first retainer ring. That is, the first planetary gear device and the first set of frictional coupling elements can be supported by the pump housing via by the first and second retainer rings, at predetermined axial positions within the cylindrical extending portion of the pump housing, when a subassembly including the pump housing, first planetary gear device and first set of frictional coupling elements is positioned such that its axis extends in the vertical direction, during the assembling of the automatic transmission. Therefore, the subassembly including the pump housing provided with an oil pump can be used for different configurations of the vehicular automatic transmission having respective different axial lengths or used for motor vehicles of respective different configurations such as FF and FR vehicles. The oil pump, first planetary gear device and first set of frictional coupling elements can be assembled within the pump housing on a sub-assembling line, to manufacture the subassembly which is subsequently assembled on a main assembling line, with respect to the stationary cylindrical housing incorporating the other components of the vehicular automatic transmission, so that the required length of the main assembling line can be reduced, and the risk of shut-down of the main assembling line can be reduced.

According to a first preferred form of this invention, the vehicular automatic transmission further comprises: a second set of frictional coupling elements disposed between the first set of frictional coupling elements and the pump housing; a second hub fixed to a carrier of the first planetary gear device; a third retainer ring fixed to the radially inner spline-fitting part, for abutting contact with the second set of frictional coupling elements, to limit an axial movement of the second set of frictional coupling elements; and a piston axially slidably received in an annular recess formed in the pump housing, for forcing the second set of frictional coupling elements, the annular recess and the piston cooperating to define therebetween an oil chamber for axially moving said piston, and wherein the second set of frictional coupling elements are splined at radially outer portions thereof to the radially inner spline-fitting part of the cylindrical extending portion, and at radially inner portions thereto to an outer circumferential surface of the second hub, so as to permit an axial movement and prevent a rotary movement of the second hub relative to the radially inner spline-fitting part and the second hub.

The vehicular automatic transmission according to the above-described first preferred form of the invention is arranged such that the second set of frictional coupling elements is disposed between the first set of frictional coupling elements and the pump housing, and such that an axial movement of the second set of frictional coupling elements is limited by the third retainer ring fixed to the radially inner spline-fitting part. Further, the piston for forcing the second set of frictional coupling elements is axially slidably received in the annular recess formed in the pump housing, and cooperates with the second piston to define the oil chamber for axially moving the second piston. Although the pump housing is required to be machined with a high degree of accuracy to form the annular recess, the radially inner spline-fitting part, etc., these machining operations on the pump housing can be performed as a series of machining steps at one time, so that the present vehicular automatic transmission can be manufactured without an increase of the required number of machining steps. In addition, the oil chamber is formed within the pump housing in which the oil pump is incorporated as a hydraulic power source, so that the piston can be operated with a high degree of stability.

According to a second preferred form of this invention, the first hub is formed by press-forming operation.

In the vehicular automatic transmission according to the second preferred form of this invention, the first hub formed by a press-forming operation has the second circumferential groove formed in the splined cylindrical portion without a machining operation. The press-forming operation permits efficient and easy fabrication of the first hub, resulting in improved productivity of the vehicular automatic transmission.

The vehicular automatic transmission according to a third preferred form of this invention further comprises an input shaft rotatably extending through the pump housing. In this vehicular automatic transmission, the first planetary gear device includes a sun gear fixed to an axial end portion of the input shaft.

In the vehicular automatic transmission according to the above-described third preferred form of the invention, the sun gear of the first planetary gear device is fixed to one of the opposite axial end portions of the input shaft, so that the input shaft can also be installed as one component of the subassembly, making it possible to further reduce the required number of assembling steps to be performed on the main assembling line, whereby the required length of the main assembling line can be reduced, and the risk of shutdown of the main assembling line can be accordingly reduced.

According to a fourth preferred form of the present invention, the first planetary gear device includes a carrier which includes a tubular portion extending in an axial direction away from the first set of frictional coupling elements, the vehicular automatic transmission further comprising: a second planetary gear device having a sun gear and disposed on one of opposite sides of the first planetary gear device which is remote from the pump housing; a sleeve which is splined at one of opposite axial end portions thereof to the tubular portion and which is provided, at the other of the opposite axial end portions, with the sun gear of the second planetary gear device; and a fourth retainer ring engaging the tubular portion of the carrier of the first planetary gear device and the sleeve, to prevent a relative axial movement of the tubular portion and the sleeve.

According to the above-described fourth preferred form of this invention, the carrier of the first planetary gear device has the tubular portion axially extending toward the second planetary gear device, and the tubular portion is splined at its one axial end portion to one axial end portion of the sleeve provided with the sun gear of the second planetary gear device. The relative axial movement of the tubular portion and the sleeve is prevented by the fourth retainer ring, so that the sleeve can also be installed as one component of the subassembly, making it possible to further reduce the required number of assembling steps to be performed on the main assembling line, whereby the risk of shutdown of the main assembling line can be further reduced.

BRIEF DESCRIPTION OF THE DRAWING

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

Referring to the accompanying drawings, the preferred embodiment of this invention will be described in detail.

Figures 1, 2:
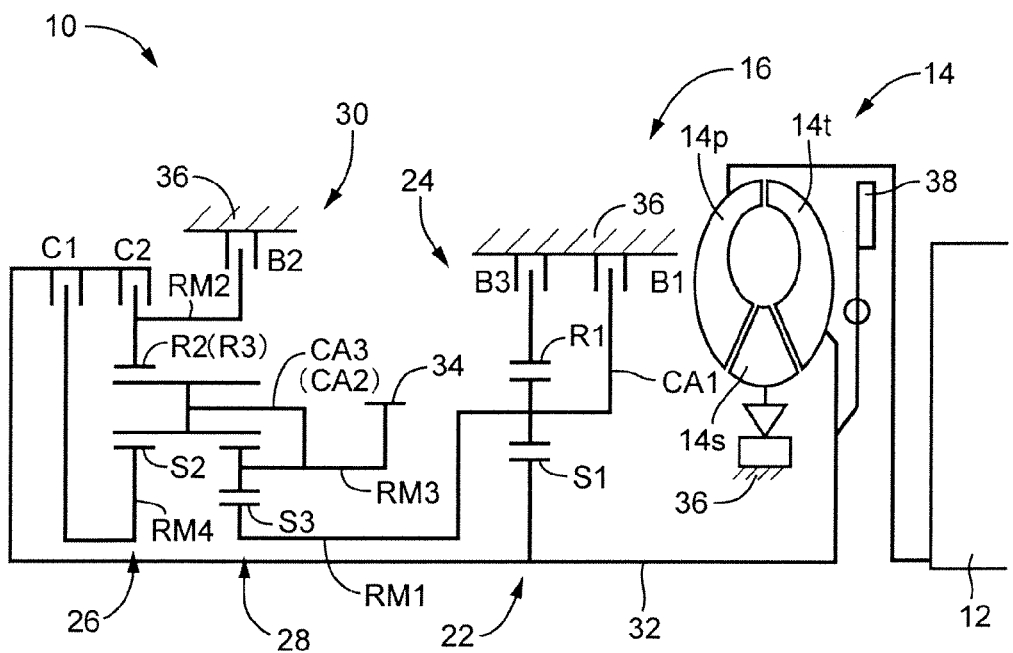
FIG. 1 is a schematic view of a vehicular drive system including an automatic transmission constructed according to one embodiment of the present invention is applicable.
FIG. 2 is a view indicating combinations of clutches and brakes placed in their engaged states to establish respective gear positions of the automatic transmission shown in FIG. 1.

Referring first to the schematic view of FIG. 1, there is shown a vehicular drive system 10, which is suitably used for an FF vehicle (front-engine front-drive vehicle), and is provided with a drive power source in the form of an internal combustion engine 12. An output of this engine 12 is transmitted to right and left drive wheels of a vehicle through a fluid-operated power transmitting device in the form of a torque converter 14, an automatic transmission 16, a differential gear device (not shown), and a pair of axles (not shown). The automatic transmission 16 is a vehicular automatic transmission constructed according to the preferred embodiment of this invention.

The torque converter 14 includes a pump impeller 14$p$ connected to a crankshaft of the engine 12, a turbine impeller 14$t$ connected to an input shaft 32 of the automatic transmission 16, and a stator impeller 14$s$ connected to a transmission casing 36 through a one-way clutch. Between the pump impeller 14$p$ and the turbine impeller 14$t$, there is interposed a lock-up clutch 38 which is engaged to connect the pump and turbine impellers 14$p$, 14$t$ to each other for rotation as a unit.

The automatic transmission 16 includes a first transmission portion 24 and a second transmission portion 30 which are disposed coaxially with each other. The first transmission portion 24 is constituted principally by a first planetary gear set 22 of a single-pinion type, while the second transmission portion 30 is constituted principally by a second planetary gear set 26 of a single-pinion type and a third planetary gear set 28 of a double-pinion type. The automatic transmission 16 is arranged to transmit a rotary motion of an input shaft 32 to an output gear 34, at a selected one of a plurality of speed ratios. The input shaft 32 functions as an input member of the automatic transmission 16, and is considered to be a turbine shaft rotated with the turbine impeller 14$t$ of the torque converter 14. On the other hand, the output gear 34 functions as an output member of the automatic transmission 16, and meshes with the differential gear device either directly or indirectly via a countershaft, to rotate the right and left drive wheels. It is noted that each of the vehicular automatic transmission 16 and the torque converter 14 is constructed symmetrically with respect to its axis, a lower half of the automatic transmission 16 and a lower half of the torque converter 14 are not shown in the schematic view of FIG. 1.

The first planetary gear set 22 of the first transmission portion 24 includes three rotary elements consisting of a sun gear S1, a carrier CA1 and a ring gear R1. The sun ear S1 is fixed to and rotated by the input shaft 32, and the ring gear R1 is selectively fixed to a stationary member in the form of the transmission casing 36 through a third brake B3 so that the rotating speed of an intermediate member in the form of the carrier CA1 is reduced with respect to that of the input shaft 32. On the other hand, the second planetary gear set 26 and third planetary gear set 28 of the second transmission portion 30 cooperate with each other to provide four rotary elements RM1 through RM4. Described in detail, the sun gear S3 of the third planetary gear set 28 constitutes the first rotary element RM1, and the ring gear R2 of the second planetary gear set 26 and the ring gear R3 of the third planetary gear set 28 are formed integrally with each other to constitute the second rotary element RM2. Further, the carrier CA2 of the second planetary gear set 26 and the carrier CA3 of the third planetary gear set 28 are formed integrally with each other to constitute the third rotary element RM3, and the sun gear S2 of the second planetary gear set 26 constitutes the fourth rotary element RM4. Namely, the second planetary gear set 26 and the third planetary gear set 28 cooperate to constitute a planetary gear train of Ravigneaux type in which the carriers CA2 and CA3 are provided by a single member, and the ring gears R2 and R3 are provided by a single member, while the pinion gear of the second planetary gear set 26 also functions as the second pinion gear of the third planetary gear set 28.

The first rotary element RM1 (sun gear S3) is selectively fixed through a first brake B1 to the transmission casing 36, and the second rotary element RM2 (ring gears R2 and R3) is selectively fixed through a second brake B2 to the transmission casing 36. The fourth rotary element RM4 (sun gear S2) is selectively connected through a first clutch C1 to the input shaft 32, and the third rotary element RM3 is selectively connected through a second clutch C2 to the input shaft 32. The first rotary element RM1 (sun gear S3) is fixed to the intermediate output member in the form of the carrier CA1 of the first planetary gear set 22, and the third rotary element RM3 (carriers CA2 and CA3) is fixed to the output gear 34, so that a rotary motion of the third rotary element RM3 is transmitted to the output gear 34. Each of the first, second and third brakes B1, B2, B3 and the first and second clutches C1, C2 is a multiple-disc type hydraulically operated frictional coupling device which is frictionally engaged by a hydraulic actuator. The automatic transmission 16 has a total of seven gear positions (operating positions) consisting of six forward drive positions ($1^{st}$ through $6^{th}$) and one reverse drive position (Rev), which are selectively established by respective combinations of those brakes B1-B3 and clutches C1, C2.

The table of FIG. 2 shows the seven combinations of the clutches C1, C2 and brakes B1, B2, B3 which are placed in their engaged state, to establish the respective gear positions (drive positions). In the table, "o" indicates the engaged states of the clutches and brakes. As is apparent from the table, the six forward drive positions of the automatic transmission 16 are established by the respective combinations of the engaged states of two frictional coupling devices selected from the two clutches C1, C2 and three brakes B1, B2, B3.

Figure 3:
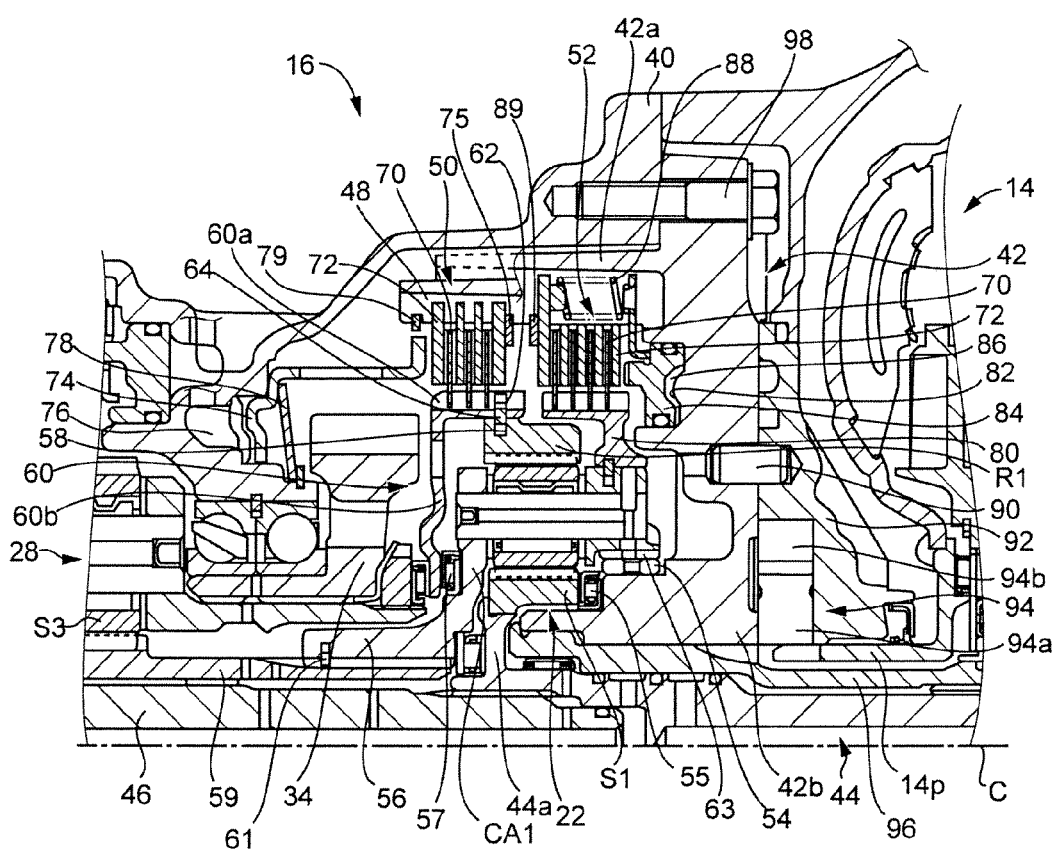
FIG. 3 is a fragmentary elevational view in cross section showing in detail the construction of the automatic transmission shown in FIG. 1.

Referring next to the fragmentary elevational view in cross section of FIG. 3, there is shown a portion of the vehicular automatic transmission 16 constructed according to the preferred embodiment of this invention. The lower half of the automatic transmission 16 which is symmetrical with respect to its axis C of rotation is not shown in FIG. 3.

As shown in FIG. 3, the vehicular automatic transmission 16 includes a stationary cylindrical housing 40, and a generally disc-shaped pump housing 42 which is fixed to the cylindrical housing 40 so as to close an axial open end of the cylindrical housing 40. Within an interior space defined by the cylindrical housing 40 and the pump housing 42, there are disposed the three planetary gear sets 22, 26, 28 (only the gear sets 22, 28 being shown in FIG. 3) and frictional coupling elements for those planetary gear sets 22, 26, coaxially with the input shaft 32 consisting of a first shaft 44 and a second shaft 46. In FIG. 3, only the first and third planetary gear sets 22, 28, and only the first and third brakes B1, B3 are shown. The output of the engine 12 is transmitted to the first shaft 44 through the torque converter 14, and the first shaft 44 is rotated by a rotary motion of the turbine impeller 14$t$. The first and second shafts 44, 46 have mutually engaging splined end portions, so that the two shafts 44, 46 are rotated as a unit. It is noted that the input shaft 44 functions as an input shaft of the automatic transmission 16.

The pump housing 42 includes a radially outer cylindrical portion 42a which extends from its radially outer portion, in an axial direction away from the torque converter 14. This radially outer cylindrical portion 42a includes a radially inner splined part 48 having spline teeth formed on its inner circumferential surface. A first set of frictional coupling elements 50 which is a part of the first brake B1, and a second set of frictional coupling elements 52 which is a part of the third brake B3 are disposed radially inwardly of the radially outer cylindrical portion 42a of the pump housing 42, such that the second set of frictional coupling elements 52 is located closer to the torque converter 14, than the first set of frictional coupling elements 50. Radially inwardly of those first and second sets of frictional coupling elements 50, 52, there is disposed the first planetary gear set 22. The output gear 34 and the third planetary gear set 28 are disposed on one of axially opposite sides of the first planetary gear set 22 which is remote from the torque converter 14, such that the output gear 34 is located closer to the torque converter 14, than the third planetary gear set 28. It is noted that the radially outer cylindrical portion 42a is a cylindrical extending portion extending from the radially outer portion of the pump housing 42 into the cylindrical housing 40, while the radially inner splined part 48 is a radially inner spline-fitting part of the cylindrical extending portion.

The pump housing 42 further includes a radially inner cylindrical portion 42b which extends from a radially inner part of the generally disc-shaped portion, in the axial direction away from the torque converter 14. The first planetary gear set 22 is rotatably supported by a sleeve 54 and a bushing 63 which are press-fitted on the outer circumferential surface of the radially inner cylindrical portion 42b of the pump housing 42. The first planetary gear set 22 is positioned in the axial direction by a thrust bearing 55 interposed between the sun gear S1 and the radially inner cylindrical portion 42b, and a thrust bearing 57 interposed between the carrier CA1 and an annular flange portion 60b of a first hub 60 (which will be described). It is noted that the first hub 60 functions as a first hub of the automatic transmission 16.

The first shaft 44 extends through the pump housing 42 and is rotatably supported by a plurality of bearings. The first shaft 44 includes a radial extension 44a formed at one of its opposite axial end portions, so as to extend in the radial direction perpendicular to the axis C. The radial extension 44a is fixed at its outer end to the sun gear S1 of the first planetary gear set 22, by welding, for example, so that the sun gear S1 is rotated with the first shaft 44. The carrier CA1 of the first planetary gear set 22 includes a tubular portion 56 extending in the axial direction toward the third planetary gear set 28. This tubular portion 56 is splined at its inner circumferential surface to a splined outer circumferential surface of one axial end portion of a sleeve 59, so that the tubular portion 56 is rotated with the sleeve 59. The sun gear S3 of the third planetary gear set 28 is formed at the other axial end portion of the sleeve 59. A relative axial movement of the tubular portion 56 and the sleeve 59 which are splined to each other is prevented by a fourth retainer ring in the form of a retainer ring 61 which engages the tubular portion 56 and the sleeve 59. It is noted that the first and third planetary gear sets 22 and 28 respectively function as first and second planetary gear devices.

The ring gear R1 of the first planetary gear set 22 has an axial end portion having a splined outer circumferential surface in which a first circumferential groove 58 is formed. The first hub 60 has a splined cylindrical portion 60a having splined outer and inner circumferential surfaces, in addition to the above-indicated annular flange portion 60b which extends from one axial end of the splined cylindrical portion 60a in the axial direction toward the output gear 34. The splined axial end portion of the ring gear R1 is splined at its inner circumferential surface to the splined outer circumferential surface of the splined cylindrical portion 60a, such that the ring gear R1 and the splined cylindrical portion 60a of the first hub 60 are axially movable relative to each other and are not rotatable relative to each other. The splined inner circumferential surface of the splined cylindrical portion 60a of the first hub 60 has a second circumferential groove 62 having the same width as the first circumferential groove 58. A second retainer ring in the form of a retainer ring 64 is fitted at a radially inner portion thereof in the first circumferential groove 58 formed in the outer circumferential surface of the ring gear R1, and at a radially outer portion thereof in the second circumferential groove 62 formed in the inner circumferential surface of the splined cylindrical portion 60a. The retainer ring 64 prevents a relative axial movement of the ring gear R1 and the first hub 60. The first hub 60 is formed by a pressing operation, and the circumferential groove 62 is formed in the process of the pressing operation. It is noted that the splined cylindrical portion 60a functions as a cylindrical spline-fitting portion of the first hub 60, while the annular flange portion 60b functions as a radially inner annular flange portion of the first hub 60.

The first set of frictional coupling elements 50 consists of a plurality of first friction plates 70 and a plurality of second friction plates 72. The first friction plates 70 are splined at their radially inner end portions to the splined outer circumferential surface of the splined cylindrical portion 60a of the first hub 60, such that the first friction plates 70 are axially movable and are not rotatable relative to the splined cylindrical portion 60a. On the other hand, the second friction plates 72 are splined at their radially outer end portions to the splined inner circumferential surface of the radially inner splined part 48 of the radially outer cylindrical portion 42a of the pump housing 42, such that the second friction plates 70 are axially movable and are not rotatable relative to the radially outer cylindrical portion 42a, and such that each of the first friction plates 70 is interposed between the adjacent ones of the second friction plates 72.

Within the stationary cylindrical housing 40, there is axially slidably received a first piston 74 for axially forcing the first set of frictional coupling elements 50. The first piston 74 cooperates with the cylindrical housing 40 to define a first oil chamber 76 for axially moving the first piston 74. The first piston 74 is a generally cylindrical member which is closed at one of its opposite axial ends and open at the other axial end, and has a comparatively large axial length so that the frictional coupling elements 60 can be axially forced against each other by the first piston 74, even though the frictional coupling elements 50 are spaced apart from the first oil chamber 76 by a relatively large distance. A sheet spring 78 is held in abutting contact with a retainer ring fixed to the cylindrical housing 40, and the inner surface of a bottom portion of the first piston 74, so that the first piston 74 is axially biased away from the first set of frictional coupling elements 50, and is normally held at its fully retracted position. On the other hand, a retainer ring 75 is fixed to the splined inner circumferential surface of the radially inner splined part 48 at an axially intermediate part thereof relatively near the second set of frictional coupling elements 52. This retainer ring 75 prevents an axial movement of the first set of frictional coupling elements 50 toward the second set of frictional coupling elements 52 after the second friction plate 72 nearest to the retainer ring 75 has been brought into abutting contact with the retainer ring 75 during an axial movement of the first piston 74 toward the retainer ring 75, so that the first and second friction plates 70, 72 of the first set of frictional coupling elements 50 are forced against each other in the axial direction, whereby the radially outer cylindrical portion 42a of the pump housing 42 and the first hub 60 are connected to each other, to prevent a rotary motion of the ring gear R1 of the first planetary gear set 22 fixed to the first hub 60.

A first retainer ring in the form of a retainer ring 79 is fixed the splined inner circumferential surface of the radially inner splined part 48 at its axial end portion remote from the pump housing 42 and the second set of frictional coupling elements 52. This retainer ring 79 limits an axial movement of the first set of frictional coupling elements 50 toward the first piston 74, beyond the retainer ring 79.

Like the first set of frictional coupling elements 50, the second set of frictional coupling elements 52 consists of a plurality of first friction plates 70 and a plurality of second friction plates 72 which are alternately disposed in the axial direction. The second set of frictional coupling elements 52 is disposed between the first set of frictional coupling elements 50 and the pump housing 42. A second hub 80 is fixed at its inner circumferential surface to the carrier CA1 of the first planetary gear set 22, and has a splined outer circumferential surface. The first friction plates 70 are splined at their radially inner ends to the splined outer circumferential surface of the second hub 80, such that the first friction plates 70 are axially movable and are not rotatable relative to the second hub 80. On the other hand, the second friction plates 72 are splined at their radially outer ends to the radially inner splined part 48 of the radially outer cylindrical portion 42a of the pump housing 42, such that the second friction plates 72 are axially movable and are not rotatable relative to the radially inner splined part 48, and such that each of the first friction plates 70 is interposed between the adjacent ones of the second friction plates 72.

The pump housing 42 has an annular recess 82 open toward the second set of frictional coupling elements 52. A second piston 84 for axially forcing the second set of frictional coupling elements 52 is axially slidably received in the annular recess 82. The second piston 84 and the annular recess 82 cooperate with each other to define a second oil chamber 86 for axially moving the second piston 84. A return spring 88 is disposed radially outwardly of the second set of frictional coupling elements 52, in abutting contact with the second piston 84, to bias the second piston 84 in the axial direction away from the second set of frictional coupling elements 52, so that the second piston 84 is normally held at its fully retracted position. On the other hand, a third retainer ring in the form of a retainer ring 89 is fixed to the splined inner circumferential surface of the radially inner splined part 48 at an axially intermediate part thereof which is relatively near the first set of frictional coupling elements 50. This retainer ring 89 prevents an axial movement of the second set of frictional coupling elements 52 toward the first set of frictional coupling elements 50 after the second friction plate 72 nearest to the retainer ring 89 has been brought into abutting contact with the retainer ring 89 during an axial movement of the second piston 84 toward the retainer ring 89, so that the first and second friction plates 70, 72 of the second set of frictional coupling elements 52 are forced against each other in the axial direction, whereby the radially outer cylindrical portion 42a of the pump housing 42 and the second hub 80 are connected to each other, to prevent a rotary motion of the carrier CA1 of the first planetary gear set 22 fixed to the second hub 80. It is noted that the second oil chamber 86 functions as a piston chamber for moving the second piston 84.

To one of the opposite sides of the pump housing 42 which is on the side of the torque converter 14, there is fixed an oil pump casing 92 by bolts or any other suitable fastening means, such that the oil pump casing 92 and the pump housing 42 are positioned relative to each other by a knock pin 90 in the circumferential direction. An oil pump 94 is disposed between the pump housing 42 and the oil pump casing 92. The oil pump 94 includes a drive gear 94a, and a driven gear 94b meshing with the drive gear 94a. The drive gear 94a is rotated by the pump impeller 14p of the torque converter 14.

Figure 4:
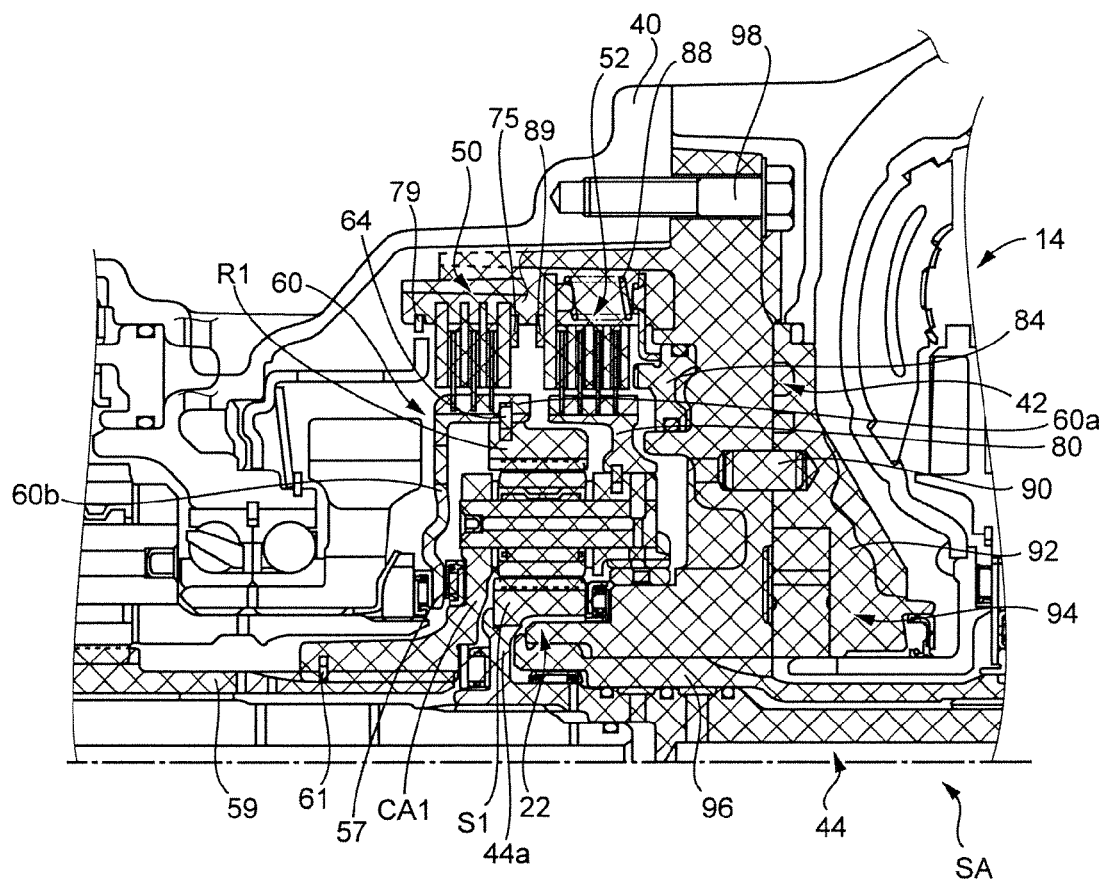
FIG. 4 is a view showing a subassembly used for the automatic transmission shown in FIG. 1.

Referring to FIG. 4, there will be described an operation to assemble some of the components of the torque converter 14 and vehicular automatic transmission 16, for manufacturing a subassembly SA of the vehicular drive system 10, on a sub-assembling line. The subassembly SA is indicated by cross-hatching lines in FIG. 4. Initially, a stator shaft 96 connected to the stator of the torque converter 14 through a one-way clutch is press-fitted in the inner circumferential surface of the radially inner cylindrical portion 42b of the pump housing 42, such that the stator shaft 96 is not rotatable relative to the pump housing 42. Then, the oil pump 94 is positioned one of the opposite axial sides of the pump housing 42 which is on the side of the torque converter 14, and the knock pin 90 is inserted into the pump housing 42 to position the pump housing 42 in its circumferential direction. Subsequently, the oil pump casing 92 is installed such that the oil pump 94 is sandwiched between the pump housing 42 and the oil pump casing 92, and such that oil pump casing 92 is also positioned by the knock pin 90 in its circumferential direction.

Then, the components of the vehicular automatic transmission 16 are installed within the pump housing 42, in the order of arrangement in the axial direction away from the pump housing 42 toward the axial position at which the third planetary gear set 28 is to be disposed. Initially, the second piston 84 is installed in the annular recess 82 formed in the pump housing 42, and the return spring 88 is disposed axially adjacent to the second piston 84. Then, the first and second friction plates 70, 72 of the second set of frictional coupling elements 52 are alternately disposed such that the second friction plates 72 are splined to the splined inner circumferential surface of the inner splined part 48, and the retainer ring 89 is fixed to the inner circumferential surface of the radially inner splined part 48. Subsequently, the sun gear S1 of the first planetary gear set 22 and the first shaft 44 are installed. The second hub 80 is then installed such that the first friction plates 70 of the second set of frictional coupling elements 52 are splined to the splined outer circumferential surface of the second hub 80. Then, the carrier CA1 of the first planetary gear set 22 and the sleeve 59 are installed. The carrier CA1, sleeve 59 and second hub 80 may be pre-assembled into a unit, which is installed within the pump housing 42. Subsequently, a unit of the first hub 60 and the ring gear R1 of the first planetary gear set 22 which are fixed together by the retainer ring 64 is installed, and the retainer ring 75 is fixed to the splined inner circumferential surface of the radially inner splined part 48. Then, the first and second friction plates 70, 72 of the first set of frictional coupling elements 50 are alternately disposed such that the first friction plates 70 are splined to the inner splined part 48 while the second friction plates 72 are splined to the first hub 60. Finally, the retainer ring 79 is fixed to the radially inner splined part 48. While the assembling of the bearings and O-rings has not been described, these components are suitably installed during the assembling operation described above.

The thus obtained subassembly SA and the cylindrical housing 40 of the vehicular automatic transmission 16 in which the various components such as the output gear 34 have been installed in position are assembled together with bolts 98 on a main assembling line, while cylindrical housing 40 is positioned such that the axis C of the automatic transmission 16 extends in the vertical direction. The subassembly SA is moved downwards into the thus positioned cylindrical housing 40 through the upper open end of the cylindrical housing 40. In this respect, it is noted that the subassembly SA is arranged to prevent the components of the subassembly SA from falling downwards even while the subassembly SA is positioned with its oil pump casing 92 being located above the first hub 60.

For instance, the second set of frictional coupling elements 52 (consisting of the first and second friction plates 70, 72) is prevented from falling, by the retainer ring 89 fixed to the axially intermediate part of the radially inner splined part 48 which relatively near the first set of frictional coupling elements 50. Further, the first set of frictional coupling elements 50 is prevented from falling, by the retainer ring 79 fixed at the axial end of the radially inner splined part 48 which is remote from the second set of frictional coupling elements 52. The first planetary gear set 22 is prevented from falling, by the first hub 60. The carrier CA1 of the first planetary gear set 22 is supported by the annular flange portion 60b of the first hub 60 via the thrust bearing 57, while the sun gear S1 is supported by the carrier CA1 via the radial extension 44a of the first shaft 44 and the thrust bearing interposed between the radial extension 44a and the carrier CA1. Namely, the sun gear S1 is supported by the annular flange portion 60b of the first hub 60 via the carrier CA1. The ring gear R1 of the first planetary gear set 22 is formed integrally with the first hub 60, that is, supported by the first hub 60. The first hub 60 supporting the first planetary gear set 22 is supported by the first set of frictional coupling elements 50. When the subassembly SA is positioned with the first hub 60 being located below the oil pump casing 92 during the assembling on the sub-assembling line, as described above, the first set of frictional coupling elements 50 is supported by the retainer ring 79. At this time, the first hub 60 is prevented from falling, by abutting contact between the first friction plates 70 of the first set of frictional coupling elements 50, and the retainer ring 64 fixed to the splined cylindrical portion 60a of the first hub 60. Thus, the first planetary gear set 22, first hub 60 and first set of frictional coupling elements 50 are directly or indirectly prevented from falling, by the retainer ring 79. The sleeve 59 is prevented from falling, by the retainer ring 61. Thus, the subassembly SA can be assembled with respect to the cylindrical housing 40, in the vertical direction, without falling of the components of the subassembly SA.

As described above, the vehicular automatic transmission 16 according to the illustrated embodiment of this invention is arranged to install the first set of frictional coupling elements 50 and the first planetary gear set 22 in the pump housing 42 such that an axial movement of the first set of frictional coupling elements 50 is prevented by the first retainer ring 79 fixed to the radially inner splined part 48 of the radially outer cylindrical portion 42a of the pump housing 42, while an axial movement of the first planetary gear set 22 is limited by the annular flange portion 60b of the first hub 70 the axial movement of which is limited by the second retainer ring 64 and the first retainer ring 79. That is, the first planetary gear set 22 and the first set of frictional coupling elements 50 can be supported by the pump housing 42 via the first and second retainer rings 79, 64, at predetermined axial positions within the radially outer cylindrical portion 42a of the pump housing 42, when the subassembly SA including the pump housing, first planetary gear set and first set of frictional coupling elements is positioned such that its axis extends in the vertical direction, during the assembling of the automatic transmission 16. Therefore, the subassembly SA including the pump housing 42 provided with the oil pump 94 can be used for different configurations of the vehicular automatic transmission 16 having respective different axial lengths or used for motor vehicles of respective different configurations such as FF and FR vehicles. The oil pump 94, first planetary gear set 22 and first set of frictional coupling elements 50 can be assembled within the pump housing 42 on the sub-assembling line, to manufacture the subassembly SA which is subsequently assembled on the main assembling line, with respect to the cylindrical housing 40 incorporating the other components of the vehicular automatic transmission 16, so that the required length of the main assembling line can be reduced, and the risk of shut-down of the main assembling line can be reduced.

The vehicular automatic transmission 16 according to the illustrated embodiment is further arranged such that the second set of frictional coupling elements 52 is disposed between the first set of frictional coupling elements 50 and the pump housing 42, and such that an axial movement of the second set of frictional coupling elements 52 is limited by the retainer ring 89 fixed to the radially inner splined part 48. Further, the second piston 84 for forcing the second set of frictional coupling elements 52 is axially slidably received in the annular recess 82 formed in the pump housing 42, and cooperates with the second piston 84 to define the second oil chamber 86 for axially moving the second piston 84. Although the pump housing 42 is required to be machined with a high degree of accuracy to form the annular recess 82, the radially inner splined part 48, etc., these machining operations on the pump housing 42 can be performed as a series of machining steps at one time, so that the present vehicular automatic transmission 16 can be manufactured without an increase of the required number of machining steps. In addition, the second oil chamber 86 is formed within the pump housing 42 in which the oil pump 94 is incorporated as a hydraulic power source, so that the second piston 84 can be operated with a high degree of stability.

The present embodiment is further arranged such that the first hub 60 formed by a press-forming operation has the circumferential groove 62 formed in the splined cylindrical portion 60a without a machining operation. The press-forming operation permits efficient and easy fabrication of the first hub 60 at a relatively high yield ratio, resulting in improved productivity of the vehicular automatic transmission 16.

In the illustrated embodiment, the sun gear S1 of the first planetary gear set 22 is fixed to one of the opposite axial end portions of the first shaft 44, so that the first shaft 44 can also be installed as one component of the subassembly SA, making it possible to further reduce the required number of assembling steps to be performed on the main assembling line, whereby the required length of the main assembling line can be reduced, and the risk of shutdown of the main assembling line can be accordingly reduced.

The vehicular automatic transmission 16 of the illustrated embodiment is further arranged such that the carrier CA1 of the first planetary gear set 22 has the tubular portion 56 axially extending toward the third planetary gear set 28, and such that the tubular portion 56 is splined at its one axial end to one axial end of the sleeve 59 provided with the sun gear S3 of the third planetary gear set 28. The relative axial movement of the tubular portion 56 and the sleeve 59 is prevented by the retainer ring 61, so that the sleeve 59 can also be installed as one component of the subassembly SA, making it possible to further reduce the required number of assembling steps to be performed on the main assembling line, whereby the risk of shutdown of the main assembling line can be further reduced.

While the preferred embodiment of this invention has been described above in detail by reference to the accompanying drawings, it is to be understood that the invention may be otherwise embodied.

Although the first hub 60 is formed by a press-forming operation in the illustrated embodiment, the first hub 60 may be formed by an aluminum die-casting operation. In this case, the mold for the die-casting operation must be formed so as to form the retainer ring 64 as an integral part of the first hub 60.

While the sleeve 59 to which the sun gear S1 is fixed is a part of the subassembly SA in the illustrated embodiment, the sleeve 59 need not be a part of the subassembly SA, and may be installed on the main assembling line.

The procedure to assemble the components in to the subassembly SA and the procedure to assemble the subassembly SA and the cylindrical housing 40 have been described above for illustrative purpose only. It is to be understood that those assembling procedures may be suitably modified, in the light of the foregoing teachings.

It is to be understood that the present invention may be embodied with various other changes and modifications which may occur to those skilled in the art, without departing from the spirit and scope of the invention defined by the following claims.

What is claimed is;

1. A vehicular automatic transmission comprising:
a stationary cylindrical housing;
a first planetary gear device accommodated in said stationary cylindrical housing and including a ring gear:
a first set of frictional coupling elements accommodated in said stationary cylindrical housing;
a generally disc-shaped pump housing fixed to said cylindrical housing, so as to close an axial open end of the stationary cylindrical housing, and including a cylindrical extending portion which extends into said stationary cylindrical housing from a radially outer portion of said pump housing in an axial direction of said pump housing and which includes a radially inner spline-fitting part;
said first planetary gear device being disposed radially inwardly of said radially inner spline-fitting part;
said first set of frictional coupling elements being disposed between said ring gear of said first planetary gear device and said radially inner spline-fitting part of said cylindrical extending portion, to selectively fix ring gear to said cylindrical extending portion;
a first retainer ring fixed to an axial end portion of said radially inner spline-fitting part, which axial end portion is remote from said pump housing, said first retainer ring abutting said first set of frictional coupling elements, to limit an axial movement of said first set of frictional coupling elements;
a first hub including a splined cylindrical portion having splined outer and inner circumferential surfaces, and further including an annular flange portion which extends from an axial end of said splined cylindrical portion radially inwardly of said splined cylindrical portion, said splined cylindrical portion being splined at its splined inner circumferential surface to an outer circumferential surface of said ring gear, and at its splined outer circumferential surface to radially inner portions of said first set of frictional coupling elements, so as to permit an axial movement and prevent a rotary movement of said first hub relative to said ring gear and said first set of frictional coupling elements;
said ring gear having a first circumferential groove formed in said outer circumferential surface, and said splined cylindrical portion of said first hub having a second circumferential groove formed in said splined inner circumferential surface; and
a second retainer ring being fitted in said first and second circumferential grooves,
whereby said first set of frictional coupling elements and said first planetary gear device can be supported by said pump housing via said first and second retainer rings, at predetermined axial positions within said cylindrical extending portion of said pump housing, during assembling of the vehicular automatic transmission.

2. The vehicular automatic transmission according to claim 1, further comprising:
a second set of frictional coupling elements disposed between said first set of frictional coupling elements and said pump housing;
a second hub fixed to a carrier of said first planetary gear device;
a third retainer ring fixed to said radially inner spline-fitting part (48), for abutting contact with said second set of frictional coupling elements, to limit an axial movement of said second set of frictional coupling elements; and
a piston axially slidably received in an annular recess formed in said pump housing, for forcing said second set of frictional coupling elements, said annular recess and said piston cooperating to define therebetween an oil chamber for axially moving said piston,
and wherein said second set of frictional coupling elements are splined at radially outer portions thereof to said radially inner spline-fitting part of said cylindrical extending portion, and at radially inner portions thereto to an outer circumferential surface of said second hub, so as to permit an axial movement and prevent a rotary movement of said second set of frictional coupling elements relative to said radially inner spline-fitting part and said second hub.

3. The vehicular automatic transmission according to claim 1, wherein said first hub (60) is formed by press-forming operation.

4. The vehicular automatic transmission according to claim 1, further comprising an input shaft rotatably extending through said pump housing, and wherein said first planetary gear device includes a sun gear fixed to an axial end portion of said input shaft.

5. The vehicular automatic transmission according to claim 1, wherein said first planetary gear device includes a carrier which includes a tubular portion extending in an axial direction away from said first set of frictional coupling elements, said vehicular automatic transmission further comprising:
a second planetary gear device having a sun gear and disposed on one of opposite sides of said first planetary gear device which is remote from said pump housing;
a sleeve which is splined at one of opposite axial end portions thereof to said tubular portion and which is provided, at the other of said opposite axial end portions, with said sun gear of said second planetary gear device; and
a fourth retainer ring engaging said tubular portion of said carrier of said first planetary gear device and said sleeve, to prevent a relative axial movement of said tubular portion and said sleeve.

6. The vehicular automatic transmission according to claim 2, including a subassembly which includes said pump housing and said cylindrical extending portion and which incorporates said first planetary gear device, said first set of frictional coupling elements, said first hub, said second set of frictional coupling elements, said second hub and said piston, said subassembly being assembled with said stationary cylindrical housing such that said cylindrical extending portion is disposed within said stationary cylindrical housing.

7. The vehicular automatic transmission according to claim 4, including a subassembly which includes said pump housing and said cylindrical extending portion and which incorporates said first planetary gear device, said first set of frictional coupling elements, said first hub, and said input shaft, said subassembly being assembled with said stationary cylindrical housing such that said cylindrical extending portion is disposed within said stationary cylindrical housing.

8. The vehicular automatic transmission according to claim 5, including a subassembly which includes said pump housing and said cylindrical extending portion and which incorporates said first planetary gear device, said first set of frictional coupling elements, said first hub, said second planetary gear device and said sleeve, said subassembly being assembled with said stationary cylindrical housing such that said cylindrical extending portion is disposed within said stationary cylindrical housing.

* * * * *